United States Patent
Lo

(10) Patent No.: US 10,911,870 B2
(45) Date of Patent: Feb. 2, 2021

(54) INTERACTIVE MUSIC TAG SYSTEM AND INTERACTIVE METHOD THEREOF

(71) Applicant: GENERALPLUS TECHNOLOGY INC., Hsinchu (TW)

(72) Inventor: Li Sheng Lo, Hsinchu (TW)

(73) Assignee: Generalplus Technology Inc., Hsinchu (TW)

( * ) Notice: Subject to any disclaimer, the term of this patent is extended or adjusted under 35 U.S.C. 154(b) by 0 days.

(21) Appl. No.: 16/812,968

(22) Filed: Mar. 9, 2020

(65) Prior Publication Data
US 2020/0288245 A1 Sep. 10, 2020

(30) Foreign Application Priority Data
Mar. 8, 2019 (TW) ............... 108107753 A

(51) Int. Cl.
*H04R 3/12* (2006.01)
*H04L 27/02* (2006.01)
*H04W 4/80* (2018.01)
*G06K 19/07* (2006.01)

(52) U.S. Cl.
CPC ........... *H04R 3/12* (2013.01); *G06K 19/0723* (2013.01); *H04L 27/02* (2013.01); *H04W 4/80* (2018.02)

(58) Field of Classification Search
CPC ...... G06K 19/0723; H04L 27/02; H04R 3/12; H04W 4/80
See application file for complete search history.

(56) References Cited

U.S. PATENT DOCUMENTS 10,396,975 B2 * 8/2019 Hung .................... H03L 7/085

* cited by examiner

*Primary Examiner* — Kile O Blair
(74) *Attorney, Agent, or Firm* — Muncy, Geissler, Olds & Lowe, P.C.

(57) ABSTRACT

An interactive music tag system and an interactive method thereof are provided in the present invention. The interactive method is adapted for an interactive music tag and an interactive music tag reader. The method includes: when the interactive music tag is close to the interactive music tag reader, outputting an wireless energy to the interactive music tag and outputting an audio envelop signal to the coil of an LC resonant circuit such that the analog audio signal is transmitted to the interactive music tag; when the interactive music tag reader controls the interactive music tag, modulating a control signal into the wireless energy; when the interactive music tag receives the control signal through the LC resonant circuit, controlling the output status of the audio envelop signal according to the control signal.

12 Claims, 6 Drawing Sheets

INTERACTIVE MUSIC TAG SYSTEM AND INTERACTIVE METHOD THEREOF

CROSS-REFERENCE TO RELATED APPLICATIONS

This application claims priority of No. 108107753 filed in Taiwan R.O.C. on Mar. 8, 2019 under 35 USC 119, the entire content of which is hereby incorporated by reference.

BACKGROUND OF THE INVENTION

Field of the Invention

The invention relates to the radio frequency application technology, and more particularly to an interactive music tag system and an interactive method thereof.

Description of the Related Art

FIG. 1 is a circuit diagram showing a radio frequency identification tag circuit of the prior art. Referring to FIG. 1, a coil 101 induces an external magnetic field, generates oscillation, and provides the power for a microprocessor 102 by way of bridge rectifying. The microprocessor 102 loads a signal to a coil Lr through an output port Dout, and returns data to a reader through mutual induction.

With the decrease in costs, more and more radio frequency identification (RFID) technologies are used in consumer and toy fields. Under the consideration of the cost and mass production of a reader, the radio frequency identification technology at 125 KHz is more frequently seen in the toy field. From the point of view of the digital wireless transmission, a data rate must be basically fast in order to transmit the audio data and to perform the multi-tag operation at the same time, so that the problems, such as the transmission error, data loss, communication collision and so on, can be solved.

In terms of EM4100/4200 compatible specifications, the data rate is about 125 KHz/16=7.8125 Kbps. Because the carrier frequency is low, the data rate cannot be easily increased. It is slightly insufficient for transferring the audio data at this speed. Meanwhile, when multiple radio frequency identification tags are present, the problem of communication collision needs to be solved, so that the effective data rate can be further decreased.

In Taiwan Patent No. M542893 disclosed by the present inventors, the wireless music tag technology is proposed. In this patent, the tag only transmits the analog acoustic wave to transmit the audio signal to a receiving end unidirectionally so as to solve the above-mentioned problem of the insufficient rate, and to transmit multiple audio signals for mixing at the same time. However, the analog audio is continuously and uninterruptedly transmitted, so that the user cannot control the audio transmitted by the music tag.

BRIEF SUMMARY OF THE INVENTION

An objective of the invention is to provide an interactive music tag system and a music tag interactive method. A control signal is carried in a power supply signal of a music tag reading end and is thus transmitted to a music tag end, which decodes the power supply signal to fetch an instruction or instructions. With this approach, the reading end can control the operation of playing, pausing, stopping, continuing, going to a previous one or going to a next one at the music tag end, for example.

In view of this, the invention provides an interactive music tag system, which includes an interactive music tag and an interactive music tag reader. The interactive music tag reader provides a wireless energy to the interactive music tag through a coil, and reads a signal transmitted by the music tag. The interactive music tag includes a LC resonant circuit and a microprocessor. The LC resonant circuit includes a first terminal and a second terminal. The microprocessor is coupled to the first terminal and the second terminal of the LC resonant circuit. When the interactive music tag is close to the interactive music tag reader, the LC resonant circuit receives the wireless energy outputted from the interactive music tag reader, and enables the microprocessor. Thereafter, the microprocessor outputs an audio envelop signal and a reverse audio envelop signal to the first terminal of the LC resonant circuit and the second terminal of the LC resonant circuit according to stored audio data. The interactive music tag reader modulates a control signal into the wireless energy, the microprocessor receives the wireless energy from one of the first terminal and the second terminal of the resonant circuit, and performs decoding to obtain the control signal, and the microprocessor controls output statuses of the audio envelop signal and the reverse audio envelop signal according to the control signal.

In the interactive music tag system according to the preferred embodiment of the present invention, the microprocessor includes a first power terminal, a second power terminal, a first input/output port, a second input/output port and a third input/output port. The first power terminal of the microprocessor is coupled to the first terminal of the LC resonant circuit, the second power terminal of the microprocessor is coupled to the second terminal of the LC resonant circuit, the first input/output port of the microprocessor is coupled to the first terminal of the LC resonant circuit, the second input/output port of the microprocessor is coupled to the second terminal of the LC resonant circuit, and the third input/output port of the microprocessor is coupled to the first terminal of the LC resonant circuit. The first input/output port of the microprocessor outputs the audio envelop signal, the second input/output port of the microprocessor outputs the reverse audio envelop signal, and the third input/output port of the microprocessor performs decoding to obtain the control signal.

In the interactive music tag system according to the preferred embodiment of the present invention, the interactive music tag system further includes a rectification circuit. The rectification circuit includes a first input terminal, a second input terminal, a first output terminal and a second output terminal. The first input terminal of the rectification circuit is coupled to the first terminal of the LC resonant circuit, and the second input terminal of the rectification circuit is coupled to the second terminal of the LC resonant circuit. The microprocessor includes a first power terminal, a second power terminal, a first input/output port, a second input/output port and a third input/output port. The first power terminal of the microprocessor is coupled to the first output terminal of the rectification circuit, the second power terminal of the microprocessor is coupled to the second output terminal of the rectification circuit, the first input/output port of the microprocessor is coupled to the first terminal of the LC resonant circuit, the second input/output port of the microprocessor is coupled to the second terminal of the LC resonant circuit, and the third input/output port of the microprocessor is coupled to the first terminal of the LC resonant circuit. The first input/output port of the microprocessor outputs the audio envelop signal, the second input/output port of the microprocessor outputs the reverse audio envelop signal, and the third input/output port of the microprocessor performs decoding to obtain the control signal.

In the interactive music tag system according to the preferred embodiment of the present invention, the LC resonant circuit includes an inductor and a capacitor. The inductor includes a first terminal and a second terminal. The first terminal of the inductor is coupled to the first terminal of the LC resonant circuit, and the second terminal of the inductor is coupled to the second terminal of the LC resonant circuit. The capacitor includes a first terminal and a second terminal. The first terminal of the capacitor is coupled to the first terminal of the LC resonant circuit, and the second terminal of the capacitor is coupled to the second terminal of the LC resonant circuit.

In the interactive music tag system according to the preferred embodiment of the present invention, when the microprocessor outputs the audio envelop signal and the reverse audio envelop signal to the first terminal of the LC resonant circuit and the second terminal of the LC resonant circuit according to the stored audio data, the microprocessor takes the audio envelop signal and the reverse audio envelop signal as carriers, and a tag identification code is modulated into the audio envelop signal and the reverse audio envelop signal by an amplitude shift Keying (ASK) modulation.

In the interactive music tag system according to the preferred embodiment of the present invention, the output statuses includes play, stop, fast forward, fast rewind, pause or double speed playback. Moreover, in the interactive music tag system according to the preferred embodiment of the present invention, audio envelop signal is obtained from an analog audio signal and a resonance signal by way of an analog modulation, and the reverse audio envelop signal is obtained from a reverse analog audio signal and the resonance signal by way of the analog modulation. The frequency of the resonance signal is substantially equal to a resonance frequency of the LC resonant circuit.

The present invention additionally provides a music tag interactive method, which is adapted for an interactive music tag and an interactive music tag reader. The music tag interactive method includes the following steps. First, when the interactive music tag is close to the interactive music tag reader, a wireless energy is outputted to the interactive music tag to enable the interactive music tag and an audio envelop signal is outputted to a coil of an LC resonant circuit to transmit an analog audio signal to the interactive music tag reader. When the interactive music tag reader performs outputting control to the interactive music tag, a control signal is modulated into the wireless energy. Then, when the interactive music tag reader receives the wireless energy through the LC resonant circuit of the interactive music tag, the wireless energy is decoded to obtain the control signal. An output status of the audio envelop signal is controlled according to the control signal.

In the interactive music tag method according to the preferred embodiment of the present invention, the output statuses includes play, stop, fast forward, fast rewind, pause or double speed playback. Moreover, in the interactive music tag method according to the preferred embodiment of the present invention, when the audio envelop signal is outputted to the LC resonant circuit according to the stored audio data, the audio envelop signal is taken as carriers and a tag identification code is modulated into the audio envelop signal by an amplitude shift Keying (ASK) modulation.

The spirit of the invention is to modulate the control signal into the wireless energy provided to the tag. With this approach, the instructions can be given to the music tag, and the music tag can be decoded into the instructions reflecting on the outputted analog music signal. Therefore, the operabilities of both the music tag reader and the music tag can be achieved, and the interactivity between both the music tag reader and the music tag can be enhanced.

The above-mentioned and other objects, features and advantages of the present invention will become more apparent from the following detailed descriptions of preferred embodiments thereof taken in conjunction with the accompanying drawings.

DETAILED DESCRIPTION OF THE INVENTION

Figure 1:
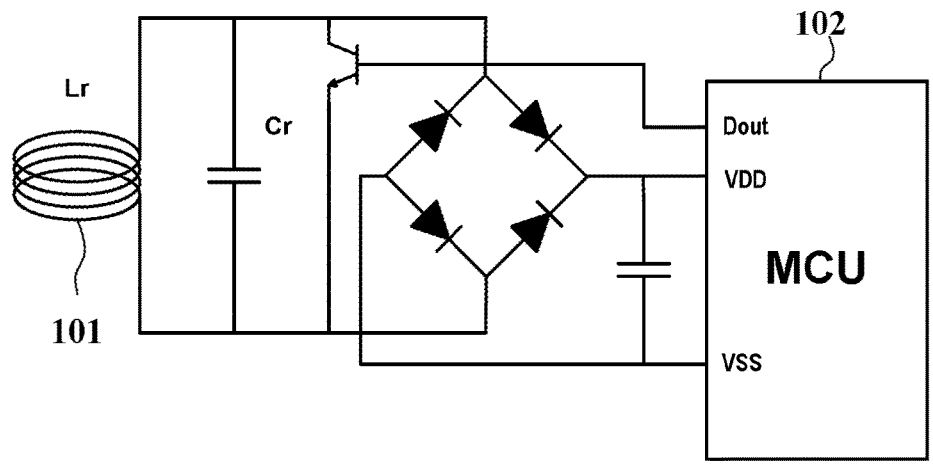
FIG. 1 illustrates a circuit diagram showing a radio frequency identification tag circuit of the prior art.
Figure 2A:
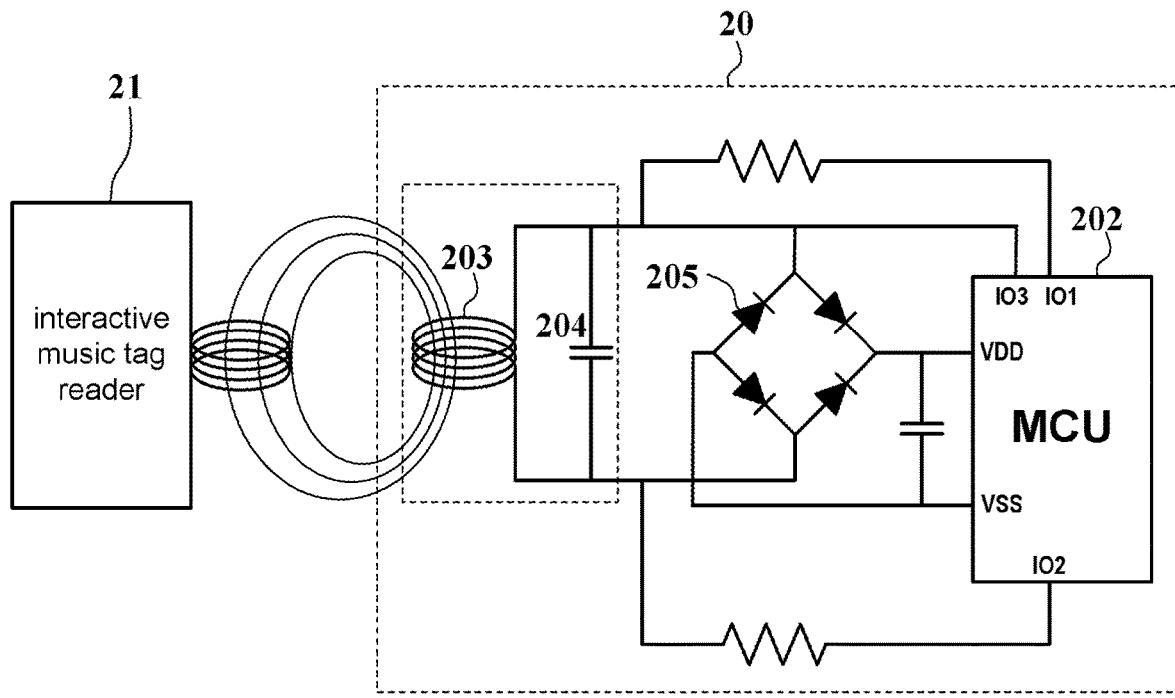
FIG. 2A illustrates a circuit diagram showing an interactive music tag system according to a preferred embodiment of the invention.

FIG. 2A illustrates a circuit diagram showing an interactive music tag system according to a preferred embodiment of the invention. Referring to FIG. 2A, the interactive music tag system includes an interactive music tag 20 and an interactive music tag reader 21. The interactive music tag includes a LC resonant circuit 201 and a microprocessor 202. The LC resonant circuit 201 is constituted by an inductor 203 and a capacitor 204. A first input/output port of the microprocessor 202 is coupled to the inductor 203 of the LC resonant circuit 201, a second input/output port of the microprocessor 202 is coupled to the capacitor 204 of the LC resonant circuit 201, a third input/output port of the microprocessor 202 is coupled to the inductor 203 of the LC resonant circuit 201, and a power terminal and a common terminal of the microprocessor 202 are respectively coupled to a first output terminal and a second output terminal of a bridge rectification circuit 205. The first input terminal and the second input terminal of the bridge rectification circuit 205 are respectively coupled to the inductor 203 of the LC resonant circuit 201 and the capacitor 204 of the LC resonant circuit 201.

The interactive music tag reader 21 provides a wireless energy to the interactive music tag through a coil, and reads a signal transmitted by the interactive music tag. Generally speaking, the interactive music tag reader 21 is similar to a radio frequency recognition reader or a near-field communication reader. Generally speaking, when the interactive music tag 20 is close to the coil of the interactive music tag reader 21, the LC resonant circuit 201 of the interactive music tag 20 receives the wireless energy, and this property is very similar to that of a radio frequency recognition device or a near-field communication device. Thereafter, the interactive music tag 20 is enabled. At this time, the first input/output port of the microprocessor 202 outputs an audio envelop signal, and the second input/output port of the microprocessor 202 outputs a reverse audio envelop signal.

Figure 2B:
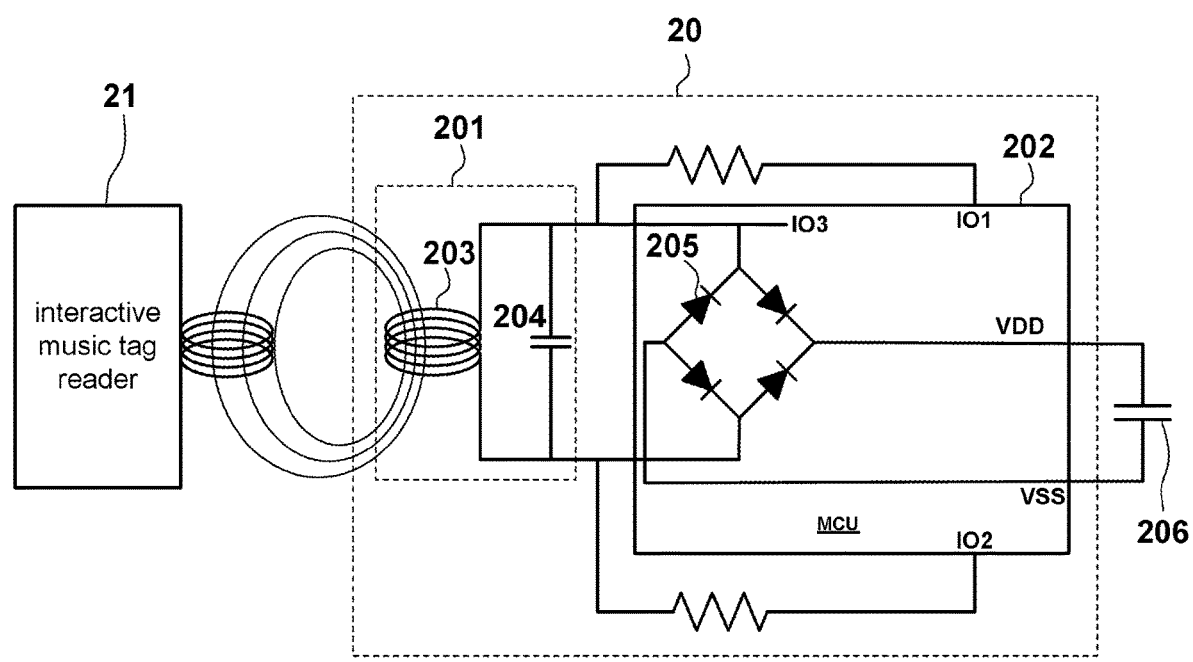
FIG. 2B illustrates a circuit diagram showing an interactive music tag system according to a preferred embodiment of the invention.

FIG. 2B illustrates a circuit diagram showing an interactive music tag system according to a preferred embodiment of the invention. Please refer to FIGS. 2A and 2B, the difference between the circuits of FIGS. 2B and 2A is that the bridge rectification circuit 205 is built inside the microprocessor 202 in FIG. 2B. The microprocessor 202 further needs two terminals to configure an external capacitor 206.

Figure 3:
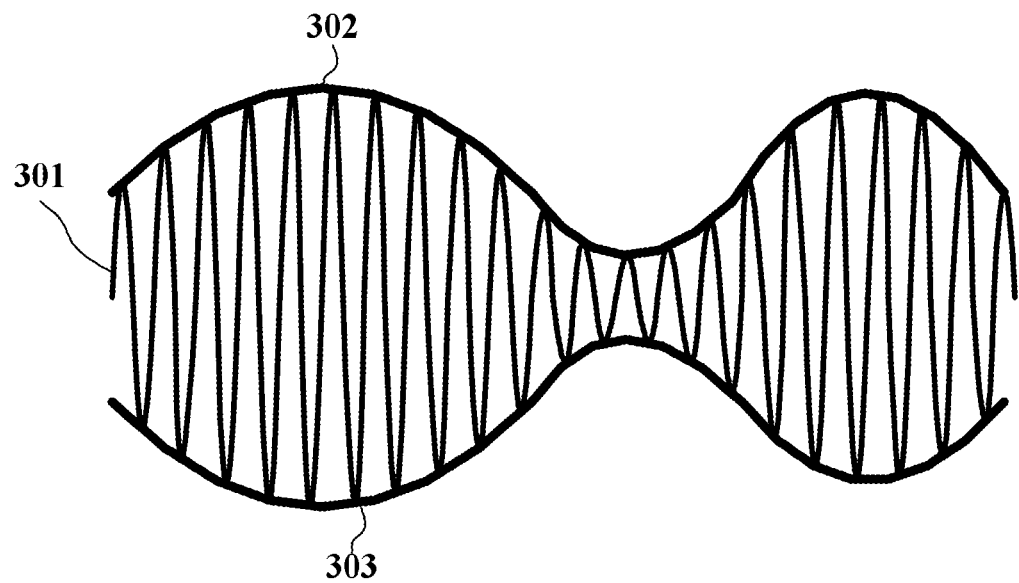
FIG. 3 illustrates an operation waveform chart of an interactive music tag system according to a preferred embodiment of the invention.
Figure 4:
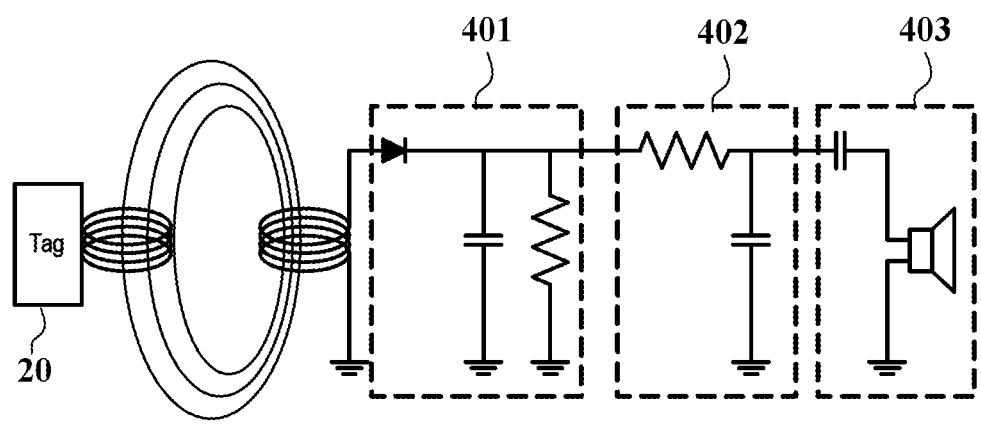
FIG. 4 illustrates an audio reduction circuit diagram of an interactive music tag reader 21 of an interactive music tag system according to a preferred embodiment of the invention.

The audio envelop signal is shown in FIG. 3. FIG. 3 illustrates an operation waveform chart of an interactive music tag system according to a preferred embodiment of the invention. FIG. 4 illustrates an audio reduction circuit diagram of the interactive music tag reader 21 of an interactive music tag system according to a preferred embodiment of the invention. Please refer to FIGS. 3 and 4. As can be seen from FIG. 3, a waveform of the audio envelop signal is constituted by a wave 301 with the resonance frequency, and an analog audio signal 302 and a reverse analog audio signal 303, wherein the analog audio signal 302 is converted from the audio data stored in the microprocessor 202 inside the interactive music tag 20. The reason to use the resonant wave to transmit audio is that the LC resonant circuit of the reader 21 can only receive the signal in the band of the resonant frequency, such that the interactive music tag reader 21 can receive the energy of the signal. Therefore, the interactive music tag reader 21 only needs to receive the above-mentioned audio envelop waveform signal, a envelop detection circuit 401 performs envelop acquiring according to the envelop waveform signal, and a RC filter circuit 402 performs filtering, so that the analog audio signal 302 can be reduced. Finally, a speaker 403 can output the above-mentioned audio signal 302.

Figure 5:
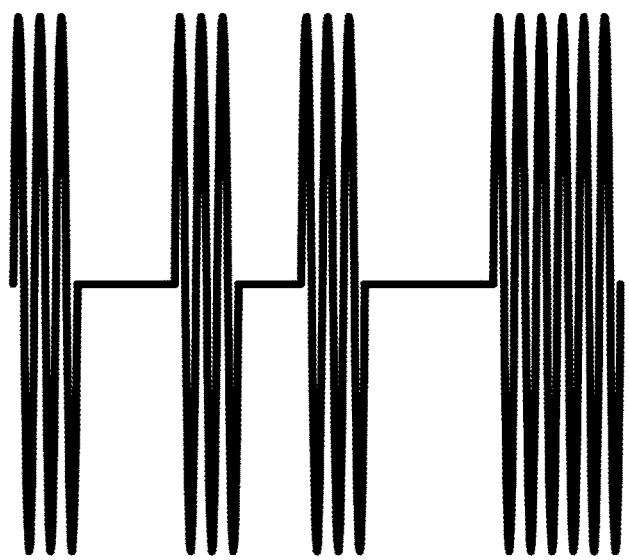
FIG. 5 illustrates an operation waveform chart showing an interactive music tag reader 21 of an interactive music tag system giving instructions to an interactive music tag 20 according to a preferred embodiment of the invention.

FIG. 5 illustrates an operation waveform chart showing the interactive music tag reader 21 of an interactive music tag system giving instructions to the interactive music tag 20 according to a preferred embodiment of the invention. Referring to FIG. 5, when the interactive music tag reader 21 transmits the instructions to the interactive music tag 20, the interactive music tag reader 21 performs an On-Off keying (OOK) modulation on the transmitted wireless energy waveform. As shown in FIG. 5, as long as the time for turning off the wireless energy is short enough, the electric power on the interactive music tag 20 can be provided by the capacitor between VDD and VSS to maintain the normal operation of the integrated circuit of the interactive music tag 20. At this time, the interactive music tag 20 reads the off time of the wireless energy waveform through a third input/output port 103 to demodulate the instructions transmitted by the interactive music tag reader 21. Therefore, the interactive music tag reader 21 can transmit the instructions of play, pause, fast forward, rewind, stop, double speed play, triple speed play and the like, for example, for the interactive music tag 20. The interactive music tag 20 can output the audio envelop waveform signal, pause outputting the audio envelop waveform signal, stop outputting the audio envelop waveform signal, or output the audio envelop waveform signal at a double speed or the like according to the different instructions.

Figure 6:
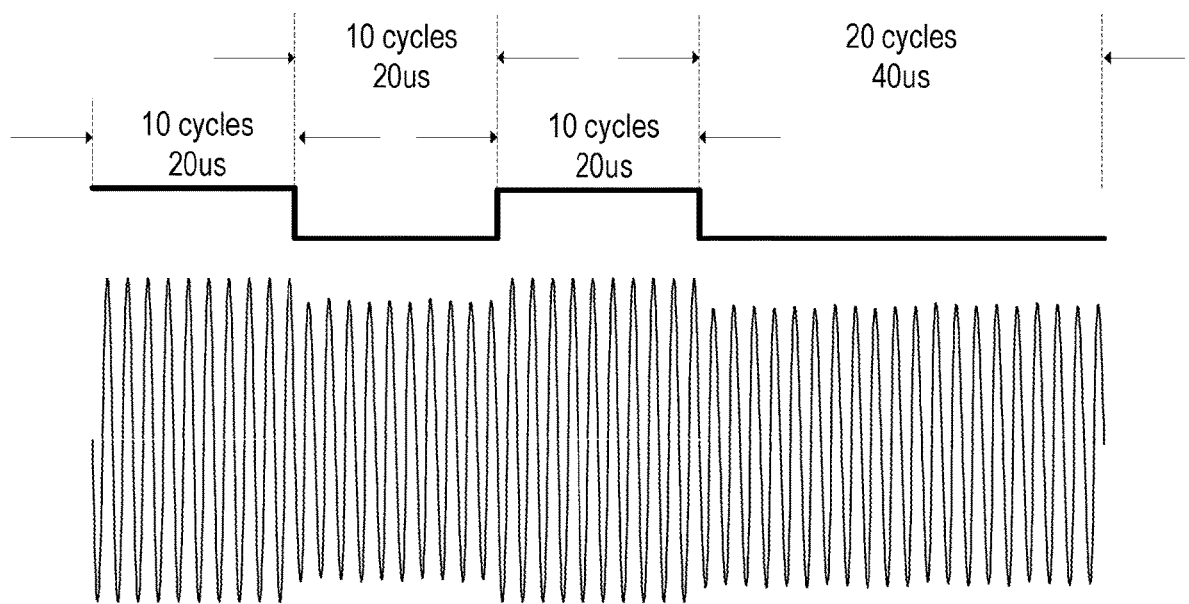
FIG. 6 illustrates an operation waveform chart showing the interactive music tag system according to a preferred embodiment of the invention.

FIG. 6 illustrates an operation waveform chart for the interactive music tag system according to a preferred embodiment of the invention. Referring to FIG. 6, assuming the number of the interactive music tags is more than one, the interactive music tag reader 21 should perform different controls respective to different interactive music tags. In this situation, the interactive music tag 20 needs to notify the interactive music tag reader 21 of its tag ID. The interactive music tag reader 21 can control the interactive music tag 20 by the signal with the corresponding tag ID which is modulated into the on/off key. In this embodiment, the interactive music tag 20 uses an ASK (Amplitude Shift Keying) signal for carrying the analog audio signal, such that the tag ID will be returned to the interactive music tag reader 21. Moreover, considering the certification-free frequency bands of RFID in different countries, the RF carrier can occupy the frequency band of 530 KHz. Therefore, the data rate is about 20 Kbps in FIG. 6. To facilitate the description of the embodiment, the resonant waveform adopts 500 KHz to serve as an example, and 10 cycles are served as a data bit.

When the interactive music tag reader 21 performs decoding, as long as the audio envelop is restored to an audio signal, and then compared with the above signal, the tag ID of the interactive music tag 20 can be decoded.

Figure 7A:
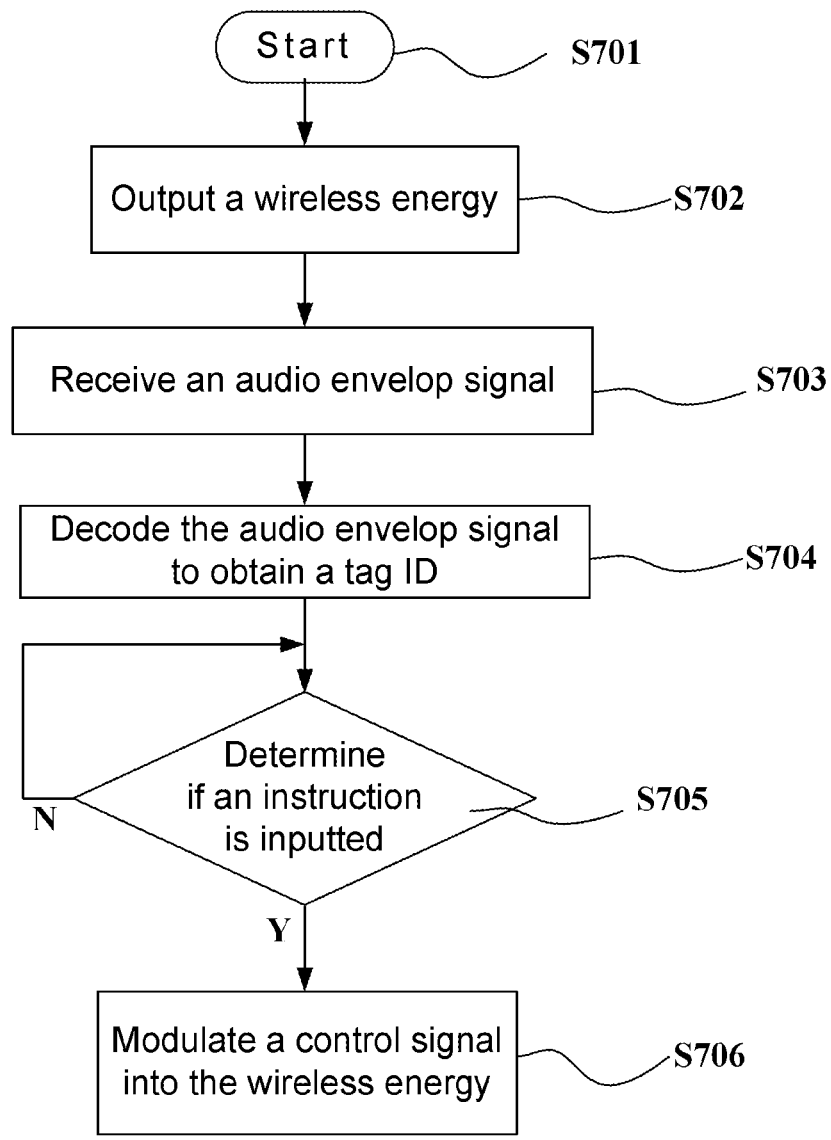
FIG. 7A illustrates a flowchart showing a music tag interactive method of an interactive music tag reader according to a preferred embodiment of the invention.

FIG. 7A illustrates a flowchart showing a music tag interactive method of an interactive music tag reader according to a preferred embodiment of the invention. Referring to FIG. 7A, the music tag interactive method comprises the following steps.

In step S701: the method starts.

In step S702: a wireless energy is outputted to an interactive music tag to enable the interactive music tag.

In step S703: an audio envelop signal is received from the interactive music tag.

In step S704: the audio envelop signal is decoded to obtain a tag ID of the interactive music tag.

In step S705: whether an instruction is inputted by a user is determined. In general, the interactive music tag reader is disposed on several buttons, for example a play button, a stop button, a fast forward button, a fast rewind button, a pause button, a double speed playback, etc.

In step S706: a control signal is modulated to the wireless energy according to inputted instruction.

Figure 7B:
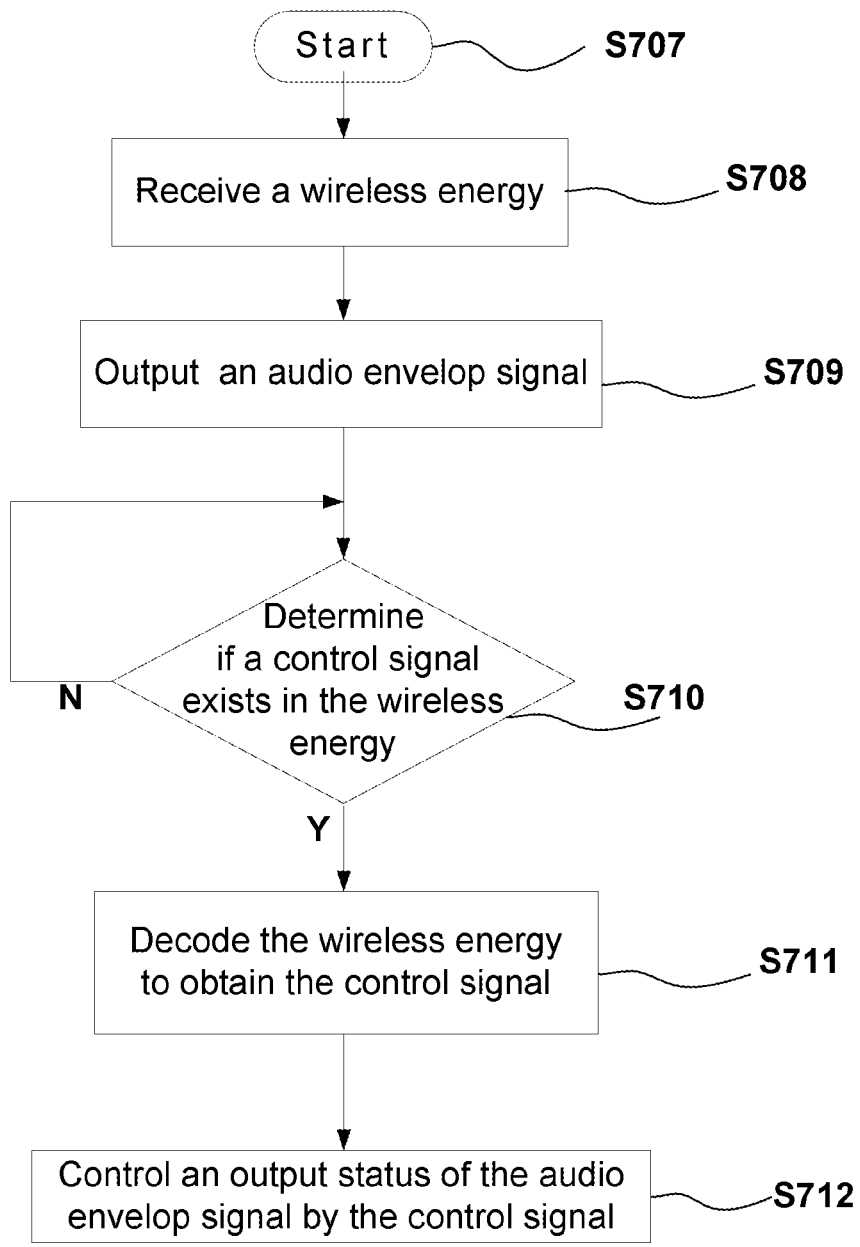
FIG. 7B illustrates a flowchart showing a music tag interactive method of an interactive music tag according to a preferred embodiment of the invention.

FIG. 7B illustrates a flowchart showing a music tag interactive method of an interactive music tag according to a preferred embodiment of the invention. Referring to FIG. 7B, the music tag interactive method comprises the following steps.

In step S707: the method starts.

In step S708: a wireless energy is received. The wireless energy is generally an electromagnetic energy transmitted from the interactive music tag reader.

In step S709: an audio envelop signal is outputted to a coil of an LC resonant circuit of the interactive music tag to transmit analog audio signal to the interactive music tag reader.

In step S710: whether a control signal exists in the wireless energy is determined. In this embodiment, the control signal is transmitted by the OOK modulation (on/off key) for example. As such, it can determine whether a control signal is sent by the interactive music tag reader to the interactive music tag according to whether the wireless energy is discontinuous or not. If there is no control signal, the determination S701 is continues to perform. If a control signal is sent, the step S711 is performed.

In step S711: the wireless energy is decoded to obtain the control signal.

In step S712: an output status of the audio envelop signal is controlled by the control signal. The output status may be an instruction of play, stop, fast forward, fast rewind, pause, double speed playback or triple speed playback and so on. After the step S712 is performed, go back to step S710.

In summary, the spirit of the invention is to load the control signal into the wireless energy provided to the tag. Therefore, the instructions can be given to the music tag, and the music tag can be decoded into the instructions reflecting on the outputted analog music signal. Therefore, the operabilities of both the music tag reader and the music tag can be achieved, and the interactivity between the music tag reader and the music tag can be enhanced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An interactive music tag system, comprising:
    an interactive music tag, comprising:
        a LC resonant circuit comprising a first terminal and a second terminal; and
        a microprocessor coupled to the first terminal and the second terminal of the LC resonant circuit; and
    an interactive music tag reader, which provides a wireless energy to the interactive music tag through a coil, and reads a signal transmitted by the interactive music tag;
    wherein when the interactive music tag is close to the interactive music tag reader, the LC resonant circuit receives the wireless energy outputted from the interactive music tag reader, and enables the microprocessor, and
    then the microprocessor outputs an audio envelop signal and a reverse audio envelop signal to the first terminal of the LC resonant circuit and the second terminal of the LC resonant circuit according to stored audio data,
    wherein the interactive music tag reader modulates a control signal into the wireless energy, the microprocessor receives the wireless energy from one of the first terminal and the second terminal of the LC resonant circuit, and performs decoding to obtain the control signal, and the microprocessor controls output statuses of the audio envelop signal and the reverse audio envelop signal according to the control signal.

2. The interactive music tag system according to claim 1, wherein the microprocessor comprises a first power terminal, a second power terminal, a first input/output port, a second input/output port and a third input/output port, wherein the first power terminal of the microprocessor is coupled to the first terminal of the LC resonant circuit, the second power terminal of the microprocessor is coupled to the second terminal of the LC resonant circuit, the first input/output port of the microprocessor is coupled to the first terminal of the LC resonant circuit, the second input/output port of the microprocessor is coupled to the second terminal of the LC resonant circuit, and the third input/output port of the microprocessor is coupled to the first terminal of the LC resonant circuit, wherein the first input/output port of the microprocessor outputs the audio envelop signal, the second input/output port of the microprocessor outputs the reverse audio envelop signal, and the third input/output port of the microprocessor performs decoding to obtain the control signal.

3. The interactive music tag system according to claim 1, further comprising:
    a rectification circuit, which comprises a first input terminal, a second input terminal, a first output terminal and a second output terminal, wherein the first input terminal of the rectification circuit is coupled to the first terminal of the LC resonant circuit, and the second input terminal of the rectification circuit is coupled to the second terminal of the LC resonant circuit;
    wherein the microprocessor comprises a first power terminal, a second power terminal, a first input/output port, a second input/output port and a third input/output port, wherein the first power terminal of the microprocessor is coupled to the first output terminal of the rectification circuit, the second power terminal of the microprocessor is coupled to the second output terminal of the rectification circuit, the first input/output port of the microprocessor is coupled to the first terminal of the LC resonant circuit, the second input/output port of the microprocessor is coupled to the second terminal of the LC resonant circuit, and the third input/output port of the microprocessor is coupled to the first terminal of the LC resonant circuit,
    wherein the third input/output port of the microprocessor is coupled to the first terminal of the LC resonant circuit, wherein the first input/output port of the microprocessor outputs the audio envelop signal, the second input/output port of the microprocessor outputs the reverse audio envelop signal, and the third input/output port of the microprocessor performs decoding to obtain the control signal.

4. The interactive music tag system according to claim 1, wherein the LC resonant circuit comprises:
    an inductor comprising a first terminal and a second terminal, wherein the first terminal of the inductor is coupled to the first terminal of the LC resonant circuit, and the second terminal of the inductor is coupled to the second terminal of the LC resonant circuit; and
    a capacitor comprising a first terminal and a second terminal, wherein the first terminal of the capacitor is coupled to the first terminal of the LC resonant circuit, and the second terminal of the capacitor is coupled to the second terminal of the LC resonant circuit.

5. The interactive music tag system according to claim 1, wherein when the microprocessor outputs the audio envelop signal and the reverse audio envelop signal to the first terminal of the LC resonant circuit and the second terminal of the LC resonant circuit according to the stored audio data, the microprocessor takes the audio envelop signal and the reverse audio envelop signal as carriers, and a tag identification code is modulated into the audio envelop signal and the reverse audio envelop signal by an amplitude shift Keying (ASK) modulation.

6. The interactive music tag system according to claim 1, wherein the output statuses comprise play, stop, fast forward, fast rewind, pause or double speed playback.

7. The interactive music tag system according to claim 1, wherein the audio envelop signal is obtained from an analog audio signal and a resonance signal by way of analog modulation, and the reverse audio envelop signal is obtained from a reverse analog audio signal and the resonance signal by way of the analog modulation, wherein a frequency of the resonance signal is substantially equal to a resonance frequency of the LC resonant circuit.

8. A music tag interactive method, adapted for an interactive music tag and an interactive music tag reader, the music tag interactive method comprising:
when the interactive music tag being close to the interactive music tag reader,
outputting a wireless energy to the interactive music tag to enable the interactive music tag, and
outputting an audio envelop signal to a coil of an LC resonant circuit to transmit an analog audio signal to the interactive music tag reader;
when the interactive music tag reader performing a outputting control to the interactive music tag, a control signal being to modulated into the wireless energy; and
when the interactive music tag reader receiving the wireless energy through the LC resonant circuit of the interactive music tag,
decoding the wireless energy to obtain the control signal, and
controlling a output status of the audio envelop signal according to the control signal.

9. The music tag interactive method according to claim 8, wherein the output statuses comprise play, stop, fast forward, fast rewind, pause or double speed playback.

10. The music tag interactive method according to claim 8, wherein interactive music tag comprises a microprocessor, wherein the microprocessor comprises a first power terminal, a second power terminal, a first input/output port, a second input/output port and a third input/output port, wherein the first power terminal of the microprocessor is coupled to a first terminal of the LC resonant circuit, the second power terminal of the microprocessor is coupled to a second terminal of the LC resonant circuit, the first input/output port of the microprocessor is coupled to the first terminal of the LC resonant circuit, the second input/output port of the microprocessor is coupled to the second terminal of the LC resonant circuit, and the third input/output port of the microprocessor is coupled to the first terminal of the LC resonant circuit,
wherein the first input/output port of the microprocessor outputs the audio envelop signal, the second input/output port of the microprocessor outputs the reverse audio envelop signal, and the third input/output port of the microprocessor performs decoding to obtain the control signal.

11. The music tag interactive method according to claim 8, wherein the LC resonant circuit comprises:
an inductor comprising a first terminal and a second terminal, wherein the first terminal of the inductor is coupled to a first terminal of the LC resonant circuit, and the second terminal of the inductor is coupled to a second terminal of the LC resonant circuit; and
a capacitor comprising a first terminal and a second terminal, wherein the first terminal of the capacitor is coupled to the first terminal of the LC resonant circuit, and the second terminal of the capacitor is coupled to the second terminal of the LC resonant circuit.

12. The music tag interactive method according to claim 8, wherein when the audio envelop signal is outputted to the LC resonant circuit according to the stored audio data, the audio envelop signal is taken as carriers and a tag identification code is modulated into the audio envelop signal by an amplitude shift Keying (ASK) modulation.

* * * * *